United States Patent
Fan et al.

(10) Patent No.: US 6,734,926 B2
(45) Date of Patent: May 11, 2004

(54) DISPLAY APPARATUS WITH A REDUCED THICKNESS

(75) Inventors: Kuo-Shu Fan, Miao-Li Hsien (TW); Chin-Lung Ting, Taipei (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 0 days.

(21) Appl. No.: 10/065,039

(22) Filed: Sep. 13, 2002

(65) Prior Publication Data

US 2004/0051824 A1 Mar. 18, 2004

(51) Int. Cl.$^7$ .............................................. G02F 1/1333
(52) U.S. Cl. ........................... 349/58; 349/58; 349/149; 349/150; 349/151; 349/152
(58) Field of Search .......................... 349/58, 149–152

(56) References Cited

U.S. PATENT DOCUMENTS

| | | | |
|---|---|---|---|
| 5,694,190 A | * | 12/1997 | Matsumoto et al. ........ 349/151 |
| 6,188,380 B1 | * | 2/2001 | Kawashima et al. ........ 345/102 |
| 6,330,148 B1 | * | 12/2001 | Won et al. ................... 361/681 |
| 6,559,908 B2 | * | 5/2003 | Hiratsuka et al. ............. 349/58 |

FOREIGN PATENT DOCUMENTS

EP  0888036 A1 * 12/1998 ............ H05K/1/18

* cited by examiner

*Primary Examiner*—Michael G. Lee
*Assistant Examiner*—Seung H Lee
(74) *Attorney, Agent, or Firm*—Winston Hsu

(57) ABSTRACT

An LCD apparatus with a reduced thickness comprises an upper frame to protect internal components, a display panel installed inside the upper frame, a light tube array disposed behind the display panel, a reflecting plate behind the light tube array, a supporting frame installed on the reflecting plate for supporting the display panel, and a circuit board for controlling the operation of the LCD apparatus. The reflecting plate comprises a main portion and a plurality of side portions. The circuit board is an integration of all control boards using printed circuit board assembly technology and is disposed on at least one of the side portions of the reflecting plate. The main portion of the reflecting plate serves as another frame and is coupled to an end of a stand assembly to support the LCD apparatus.

42 Claims, 13 Drawing Sheets

DISPLAY APPARATUS WITH A REDUCED THICKNESS

BACKGROUND OF INVENTION

1. Field of the Invention

The present invention relates to a Liquid Crystal Display (LCD) apparatus with a reduced thickness, and more specifically, to an LCD apparatus with no control circuit board installed onto the back of the back light unit.

2. Description of the Prior Art

As technology advances, computers are extensively utilized by home users as well as within companies. With the coming of age of multimedia technology, personal computers now have exceptional graphical capabilities, making a monitor one of the most important components of a personal computer system.

Currently, the most popular types of monitors are Cathode Ray Tube (CRT) monitors and LCD monitors. CRT monitors employ electron beams to excite fluorescent material to generate an image. Accordingly, CRT monitors have high power consumption for generating the electron beams, and require a large volume to accommodate the CRT itself. Monitors of larger screen size require larger bodies to accommodate the CRTs, and this often leads to an inconvenience for the user. In addition, CRT monitors generate electromagnetic radiation when displaying images and this affects users health. Due to the aforementioned issues, LCD monitors are gradually becoming embraced by computer users as mainstream products, and as replacements for CRT monitors. Not only do LCD monitors use less space, they also consume less power. Furthermore, LCD monitors do not generate enough electromagnetic radiation to be a user health concern.

Among various types of LCD apparatuses, direct-type LCD apparatuses, such as direct-type LCD monitors and televisions, are broadly used as large-size display.

Please refer to FIG. 1, which illustrates the constituent components of a well-known direct-type LCD monitor 10. The LCD monitor 10 comprises an upper frame 12 and a lower frame 24 which hold in place the internal components of the LCD monitor 10. The internal components comprise an LCD panel 14 for displaying images, a diffuser 18 to equalize light, a light tube array 20 to generate white light, and a reflecting plate 22 to reflect the light generated by the light tube array 20. A stand assembly 25 is also included to support the LCD monitor 10. When the light emitted by the light tube array 20 shines directly onto the diffuser 18 or is reflected by the reflecting plate 22 before reaching the diffuser 18, the diffuser 18 equalizes the light so that the light provides uniform illumination to the LCD panel 14.

FIG. 2 shows the back of the reflecting plate 22 shown in FIG. 1. On the back of the reflecting plate 22 are an X-board 30 and a Y-board 32 electrically connected to the LCD panel 14, an analog-to-digital converter (A/D board) 34 to convert analog signals into digital signals, a control board 35 connected to X-board 30 and Y-board 32, and a connector 36 connected to the A/D board 34. The connector 36 receives signals sent from an imaging device such as a computer video card. The signals are then converted to digital signals via the A/D board 34 that are then fed into the control board 35. The control board 35 generates corresponding signals for the X-board 30 and the Y-board 32. The X-board 30 and the Y-board 32 then generate corresponding control signals for the LCD panel 14 to display images.

In those direct-type LCD apparatuses, a light tube array 20 illuminates the display panel 14 with no bulky light guide plate and hence the weight of the apparatuses is reduced. However, employing the light tube array 20 requires enough space for diffusion of the light, which rules out the possibility of further slimming direct-type LCD apparatuses in this regard. Besides, existing technology is implemented in such a way that the control elements are installed between reflecting plate 22 and lower frame 24, so that the thickness of the LCD apparatus is increased, which causes inconveniences in using and installing.

SUMMARY OF INVENTION

It is therefore a primary objective of the claimed invention to provide a display apparatus with reduced thickness to solve the abovementioned problems of the prior art.

The first preferred embodiment of the claimed invention includes a display apparatus, which comprises an upper frame, a display panel installed in the upper frame to display images, a light tube array behind the display panel to generate light, a reflecting plate disposed behind the light tube array to reflect the light generated by the light tube array, and a supporting frame installed on the reflecting plate to support the display panel. The reflecting plate comprises a main portion and at least one side portion, each the of side portions tilted with respect to the main portion. The display apparatus also comprises a circuit board attached to at least one side portion of the reflecting plate and installed within the gap between the side portion of the reflecting plate and the supporting frame in order to control the operation of the display apparatus.

The second preferred embodiment of the claimed invention includes an display apparatus, which comprises an upper frame, a display panel installed inside the upper frame for displaying images, an array of light tubes disposed behind the display panel for generating light, a reflecting sheet positioned behind the array of light tubes for reflecting light generated by the array of light tubes, a supporting plate having a main portion and at least one side portion being tilted with respect to the main portion, a supporting frame positioned onto the main portion of the supporting plate for supporting the display panel, and a circuit board for controlling operations of the display apparatus. The main portion of the supporting plate is used for supporting the reflecting sheet. The supporting frame has a plurality of sub-frames, and at least one of the sub-frames is tilted with respect to the main portion of the supporting plate and is separated from the side portion of the supporting plate by a gap. The circuit board is installed within the gap.

The third preferred embodiment of the claimed invention includes an display apparatus, which comprises an upper frame, a display panel installed inside the upper frame to display images, a light tube array behind the display panel to generate light, a reflecting plate placed at the back of the light tube array to reflect the light generated by the light tube array, a supporting frame installed on the reflecting plate to support the display panel, and a lower frame. The reflecting plate comprises a main portion and at least one side portion, each the of side portions tilted with respect to the main portion. The display apparatus also comprises a circuit board attached to at least one side-portion of the reflecting plate and installed within the gap between the side portion of the reflecting plate and the lower frame in order to control the operation of the display apparatus.

The fourth preferred embodiment of the claimed invention includes andisplay apparatus, which comprises an upper frame, a display panel installed inside the upper frame for displaying images, an array of light tubes disposed behind the display panel for generating light, a reflecting sheet positioned behind the array of light tubes for reflecting light generated by the array of light tubes, a supporting plate having a main portion and at least one side portion being tilted with respect to the main portion, a supporting frame positioned onto the main portion of the supporting plate for supporting the display panel, a lower frame, and a circuit board for controlling operations of the display apparatus. The main portion of the supporting plate is used for supporting the reflecting sheet. The supporting frame has a plurality of sub-frames, and at least one of the sub-frames is tilted with respect to the main portion of the supporting plate. The circuit board is installed onto at least one side portion of the supporting plate and within the gap between the side porting of the supporting plate and the lower frame.

It is an advantage of the claimed invention, in which no circuit board is installed on the back side of the direct-type back light unit, such that the display apparatus has a simplified frame structure and is therefore slimmer and more convenient to use. It is a further advantage of the claimed invention that production cost of the display apparatus is greatly reduced.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
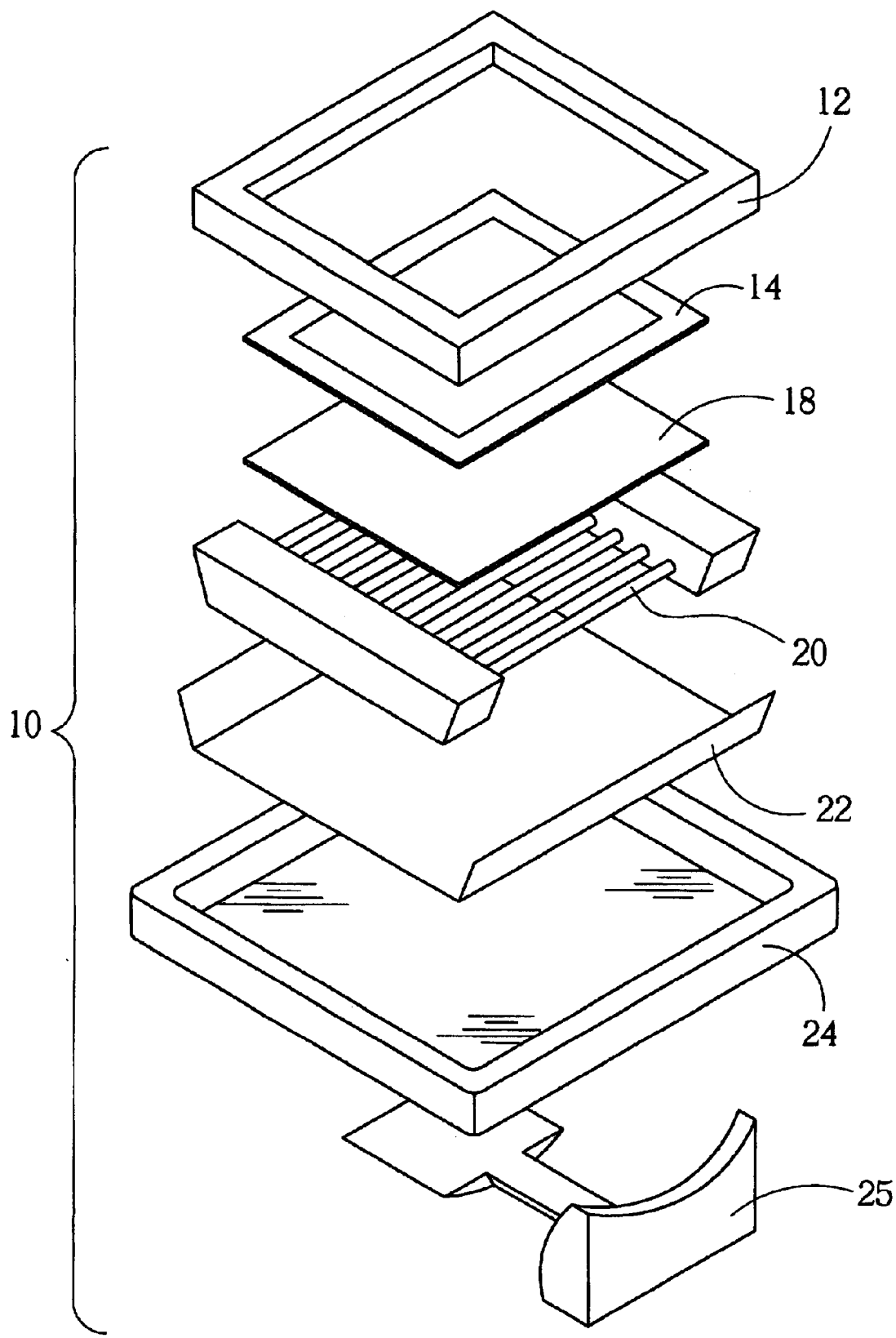
FIG. 1 is an exploded perspective view of a prior art direct-type LCD apparatus.
Figure 2:
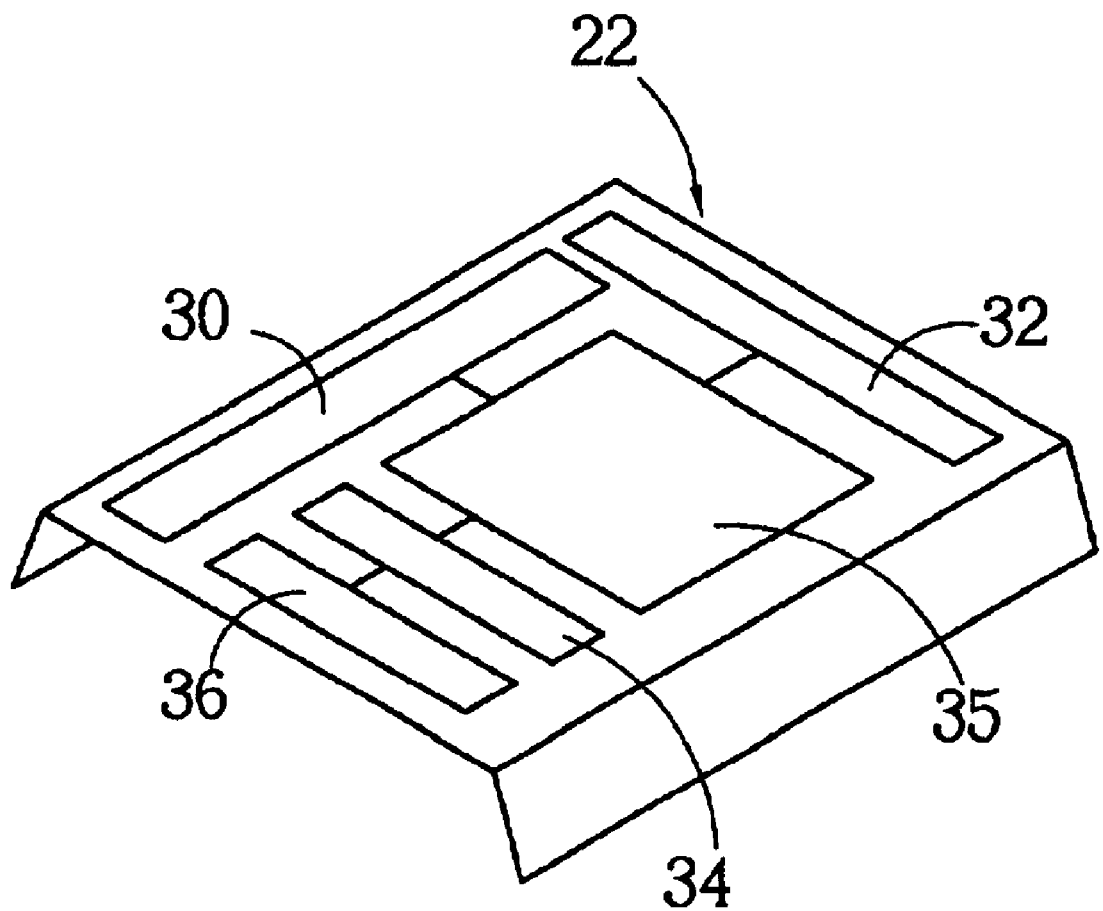
FIG. 2 is a perspective view of a backside of the prior art reflecting plate shown in FIG. 1.
Figure 3:
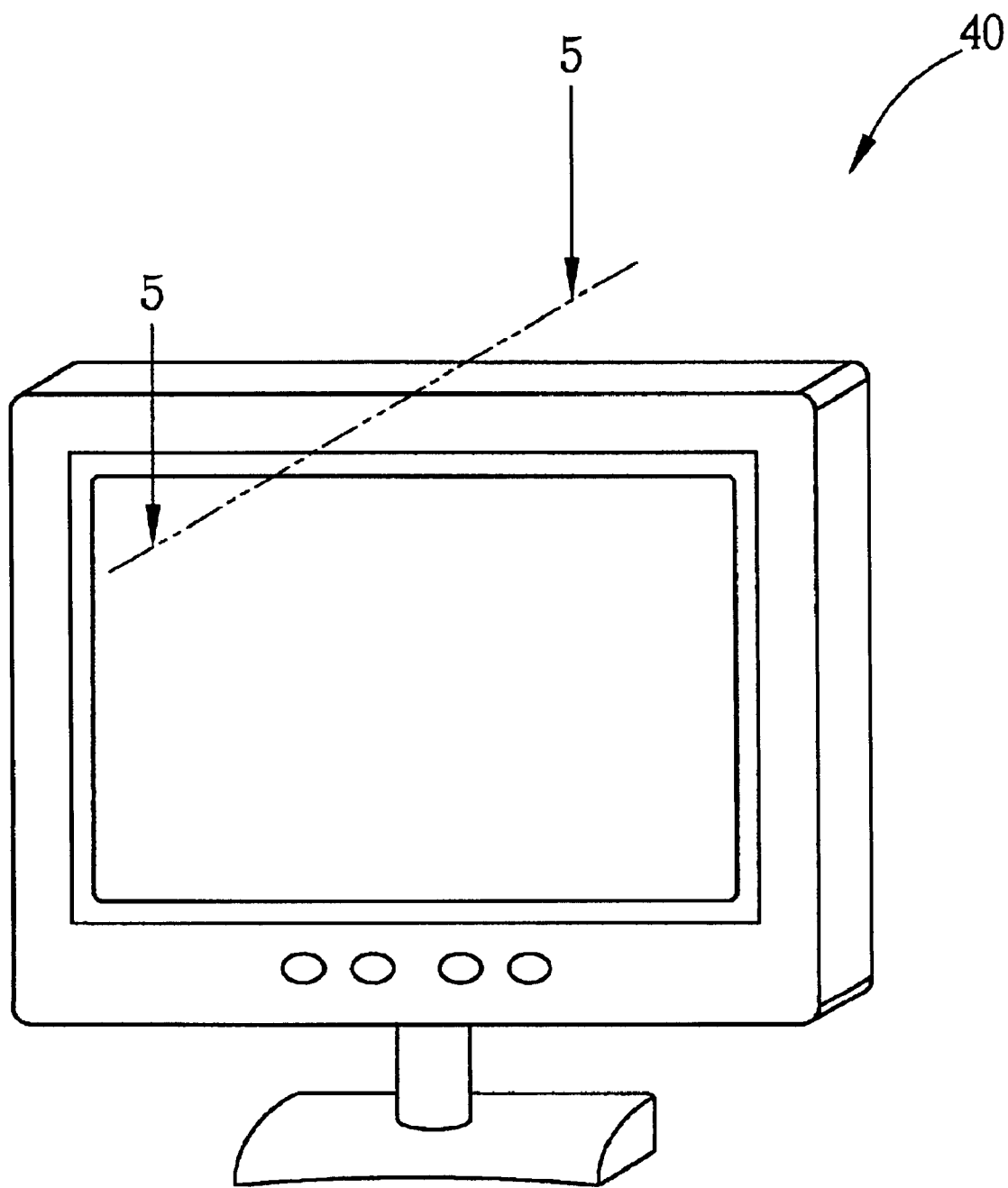
FIG. 3 is a perspective view of a present invention direct-type LCD apparatus.
Figure 4:
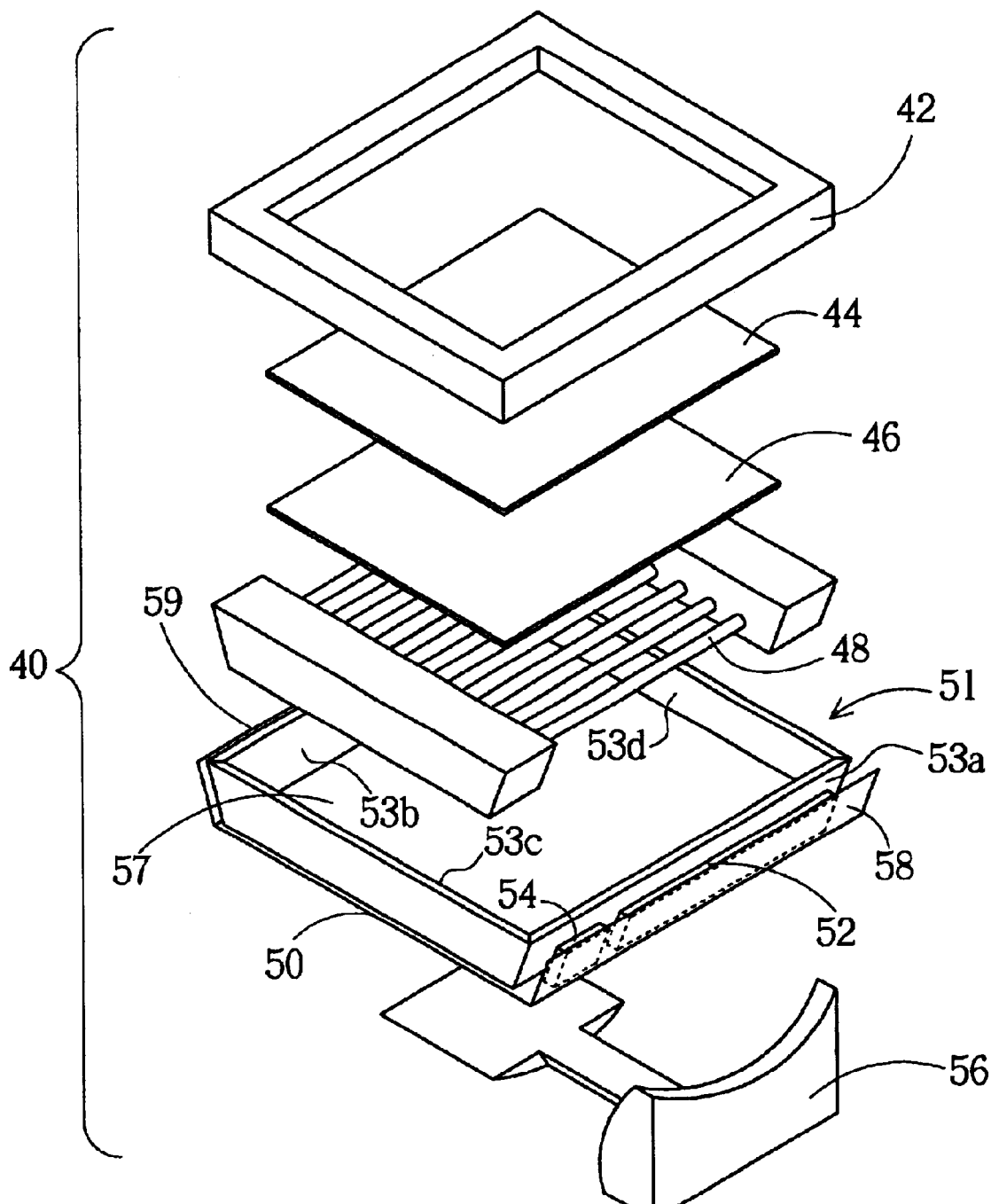
FIG. 4 is an exploded perspective view of a first embodiment of the present invention shown in FIG. 3.
Figure 5:
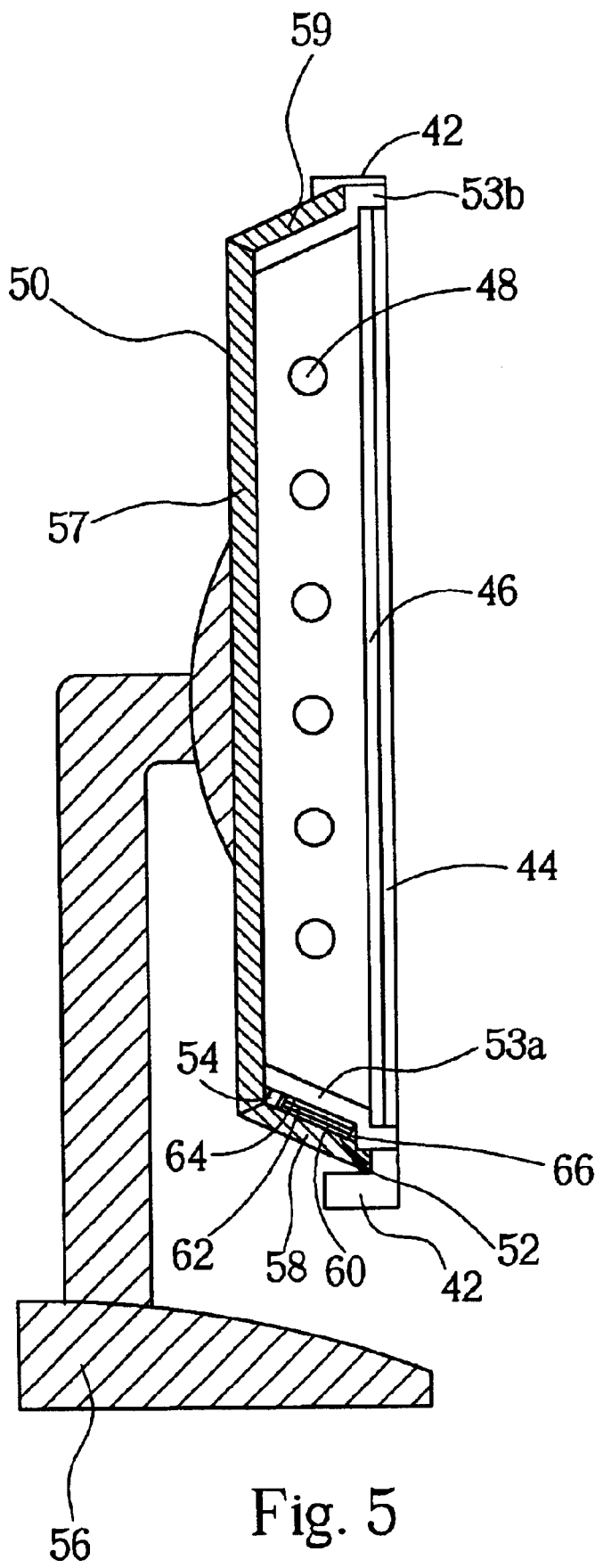
FIG. 5 is a cross-sectional view of the first embodiment of the present invention along a line 5–5" shown in FIG. 3.

Please Refer to FIG. 3, FIG. 4, and FIG. 5. FIG. 3 illustrates a direct-type LCD apparatus 40 according to the present invention, and shows a section line 5–5" used for FIG. 5. FIG. 4 illustrates components of the LCD apparatus 40 according to the first embodiment of the present invention. The LCD apparatus 40 comprises an upper frame 42, a liquid crystal display panel 44 installed inside the upper frame 42, a light tube array 48 installed behind the display panel 44 for generating white light, a diffuser 46 interposed between the display panel 44 and the light tube array 48 in order to uniformly diffuse the light generated by the light tube array 48, a reflecting plate 50 disposed behind the light tube array 48, a supporting frame 51 installed on the reflecting plate 50 to support the liquid crystal display panel 44 and the diffuser 46, a circuit board 52 to control the display panel 44, and a connector 54 to receive signals sent by imaging devices. The reflecting plate 50 comprises a main portion 57 and two side portions 58, 59. Each of the side portions 58, 59 is tilted with respect to the main portion 57. The supporting frame 51 comprises four sub-frames 53a, 53b, 53c, 53d, among which at least sub-frames 53a and 53b are also tilted with respect to the main portion 57 so as to reflect the light generated by the light tube array 48. In addition, sub-frame 53a is separated from the side portion of the reflecting plate 58 by a gap 66.

The first preferred embodiment of the present invention utilizes the supporting frame 51 so that the LCD apparatus 40 is strengthened and capable of withstanding the effects of external forces. Moreover, the main portion 57 of the reflecting plate 50 along with the sub-frames 53a, 53b, 53c and 53d of the supporting frame 51 constitute a reflecting surface, which reflects the light generated by the light tube array 48. The circuit board 52 comprises at least an X-board 60 to drive pixels in the same row for displaying corresponding data, a control board 62 used to control the X-board 60, and an A/D board 64 to convert analog signals into digital signals. The circuit board 52 can be a rigid circuit board or a printed circuit board. The circuit board 52 could also include an electromagnetic interference shield to shield the electromagnetic radiation generated by the circuit board 52. In this embodiment, the circuit board 52 of the direct-type LCD apparatus 40 is installed onto either the side portion 58 of the reflecting plate 57 or the sub-frame 53a of the supporting frame 51 by making use of the gap 66.

In order to reduce the weight of the LCD apparatus 40, the supporting frame 51 can be made of materials such as plastic. Additionally, by using multi-layer printed circuit board technology, all of the control boards such as the X-board 60 and the analog-to-digital converter 64 can be integrated into the single circuit board 52 through printed circuit board assembly (PCBA). Another weight saving feature is that the reflecting plate 50 forms a part of the frame of the LCD apparatus 40. A stand assembly 56 could be further provided and coupled to either the reflecting plate 57 to support the LCD apparatus 40. The present invention is not limited by the first preferred embodiment described. For example, one end of the stand assembly 56 can be installed on the bottom side of the upper frame 42 to support the entire LCD apparatus 40. Additionally, the sub-frame 53b and the side portion 59 can also be used to form another gap with the same purpose as the gap 66 formed by the sub-frame 53a and the side portion 58. Part of the circuit board 52 can then be attached to the side portion 58 reflecting plate 50 or the sub-frame 53a, while the rest is attached to the side portion 59 or the sub-frame 53b, so as to make complete use of the space between the two side portions 58, 59 and the supporting frame 51. Without any circuit board 52 is installed on the back side of the reflecting plate 50, the thickness of the LCD apparatus 40 is reduced.

Figure 6:
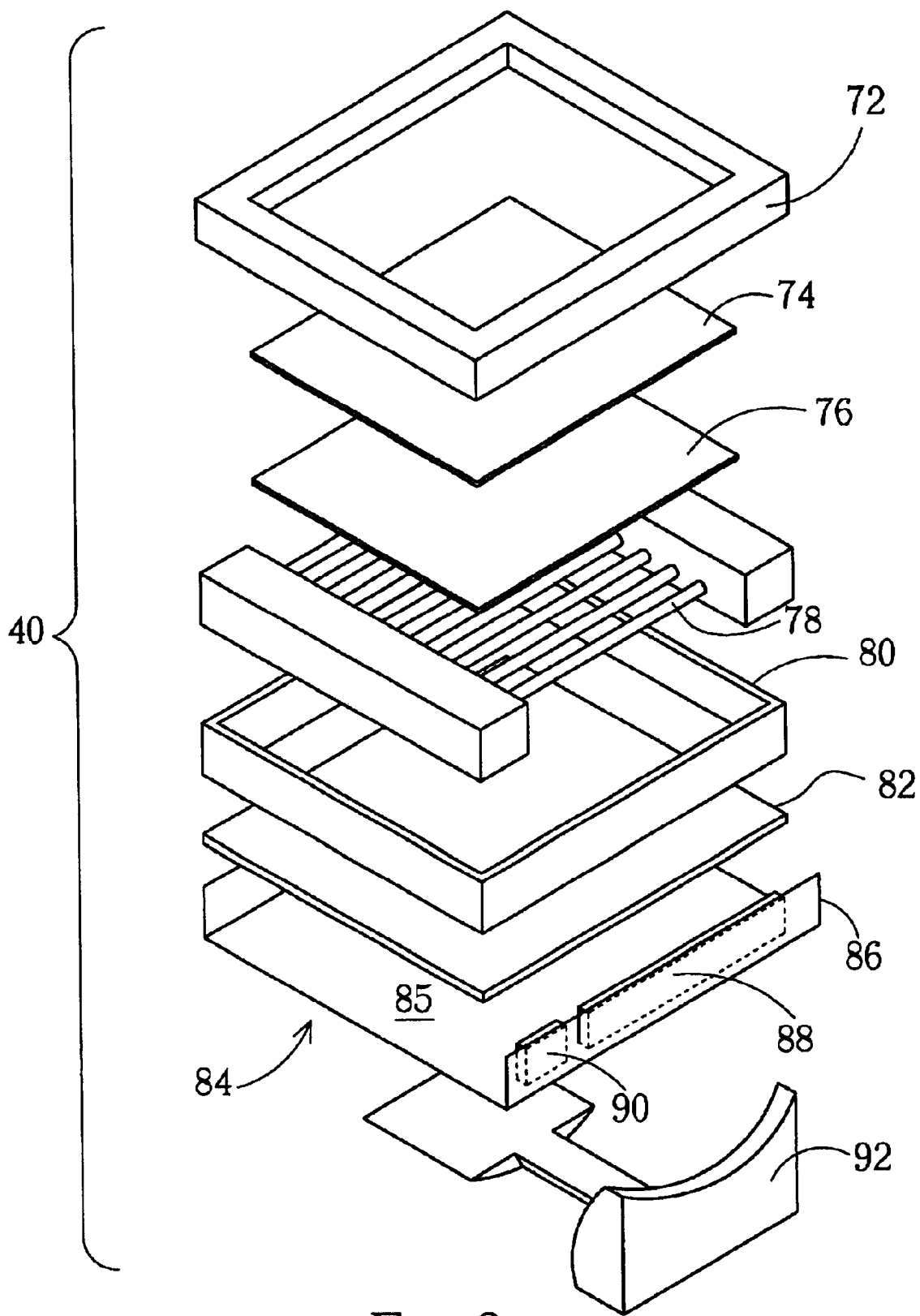
FIG. 6 is an exploded perspective view of a second embodiment of the present invention shown in FIG. 3.
Figure 7:
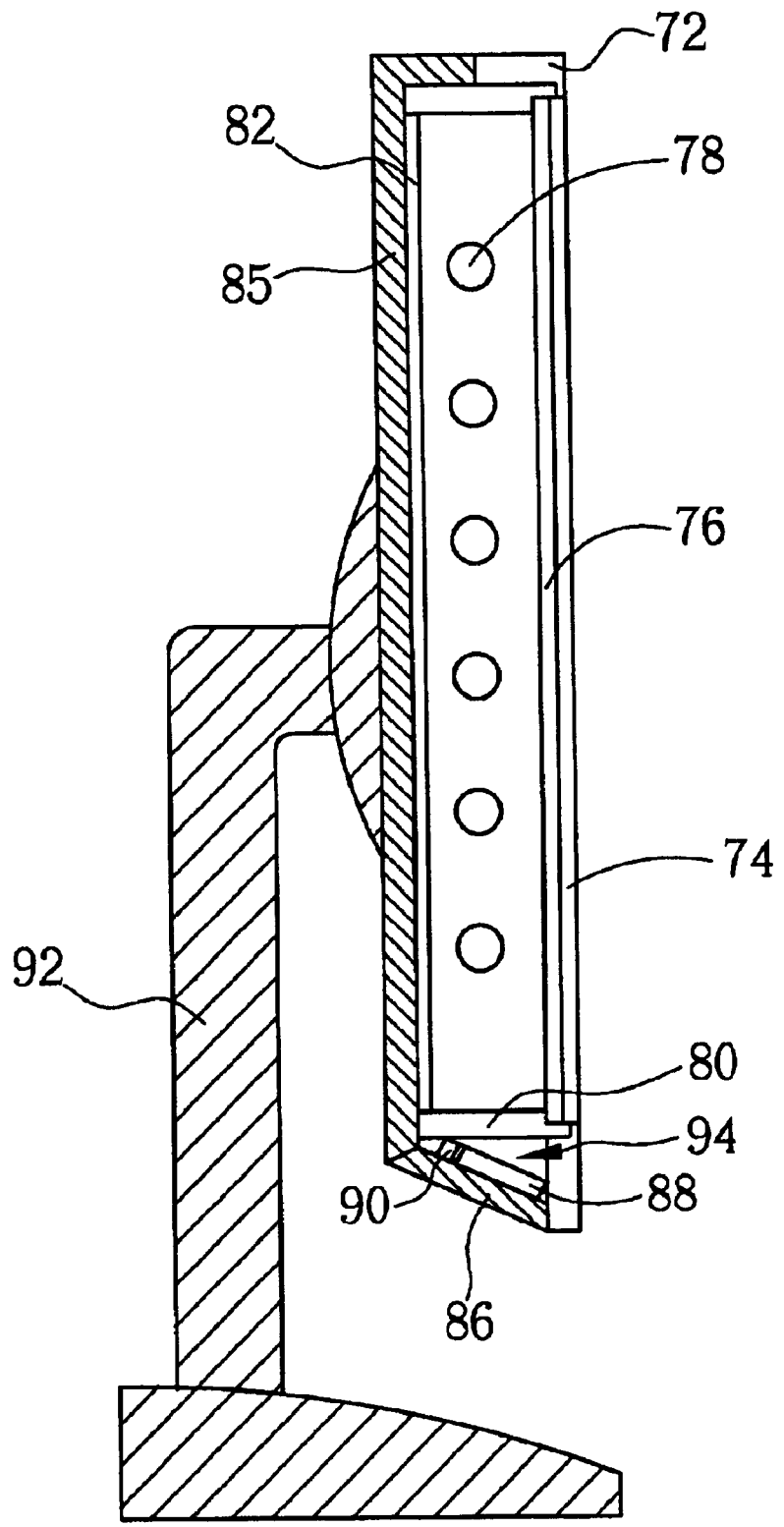
FIG. 7 is a cross-sectional view of the second embodiment of the present invention along a line 5–5" shown in FIG. 3.

Please refer to FIG. 6 and FIG. 7. FIG. 6 is an exploded perspective view of a second embodiment of the present invention and FIG. 7 is a cross-sectional view of the second embodiment along a line 5–5" shown in FIG. 3. The LCD apparatus 40 comprises anupper frame 72, a liquid crystal display panel 74 installed inside the upper frame 72, a light tube array 78 installed behind the display panel 74 for generating white light, a diffuser 76 interposed between the liquid crystal display panel 74 and the light tube array 78 in order to uniformly diffuse the light generated by the light tube array 78, a supporting frame 80 for supporting the liquid crystal display panel 74, a reflecting sheet 82 for reflecting light generated by the light tube array 78, and a supporting plate 84 for supporting the supporting frame 80. The supporting plate 84 has a main portion 85 and at least one side portion 86. The reflecting sheet 82 is positioned onto the main portion 85. As shown in FIG. 6, the side portion 86 is tilted with respect to the main portion 85. A gap 94 exists between the side portion 86 and the supporting frame 80. The LCD apparatus further comprises a circuit board 88 for controlling the display panel 74, and a connector 90 for receiving display data sent by an external display controller such as a VGA card of a computer system. The circuit board 88 is installed within the gap 94.

In this second preferred embodiment, the circuit board 88 can be a rigid circuit board or a printed circuit board. The circuit board 88 could also include an electromagnetic interference shield to shield the electromagnetic radiation generated by the circuit board 88. For example, a heatsink covering the circuit board 88 not only prevents the circuit board 88 from running under high temperature, but also functions as an electromagnetic interference shield.

As mentioned above, the circuit board 88 is installed within the gap 94 without increasing thickness of the LCD apparatus 40. Besides, for further reducing the weight, the supporting plate 84 serves a part of the frame of the LCD apparatus 40. A stand assembly 92 could be further provided and coupled to either the supporting plate 84 to support the LCD apparatus 40.

The present invention is not limited by the second preferred embodiment described. For example, one end of the stand assembly 92 can be installed on the bottom side of the upper frame 72 to support the entire LCD apparatus 40. Additionally, the gap 94 can exist in any side of the LCD apparatus 40 through appropriate arrangement of the side portion 86. For example, when the side portion 86 is positioned on the top of the main portion 85, the gap 94 will exist on the top of the LCD apparatus 40. In addition, the supporting plate 84 can have more than one side portion 86 for accommodating more circuit boards 88 to better drive the LCD apparatus 40 without increasing its corresponding thickness and weight. The alternative arrangement also can achieve the same goal of reducing the thickness of the prior art LCD apparatus 10.

Figure 8:
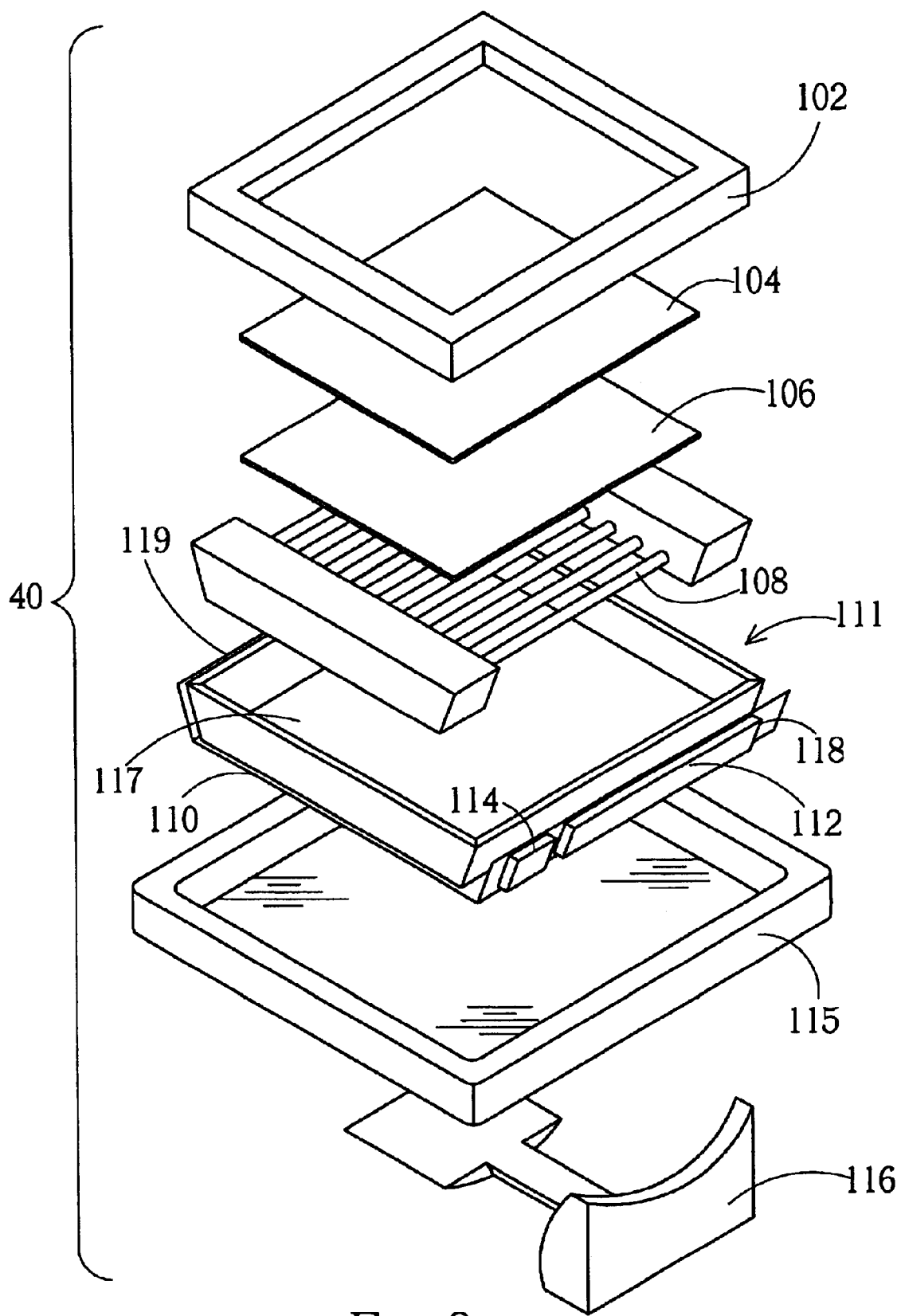
FIG. 8 is an exploded perspective view of a third embodiment of the present Invention shown in FIG. 3.
Figure 9:
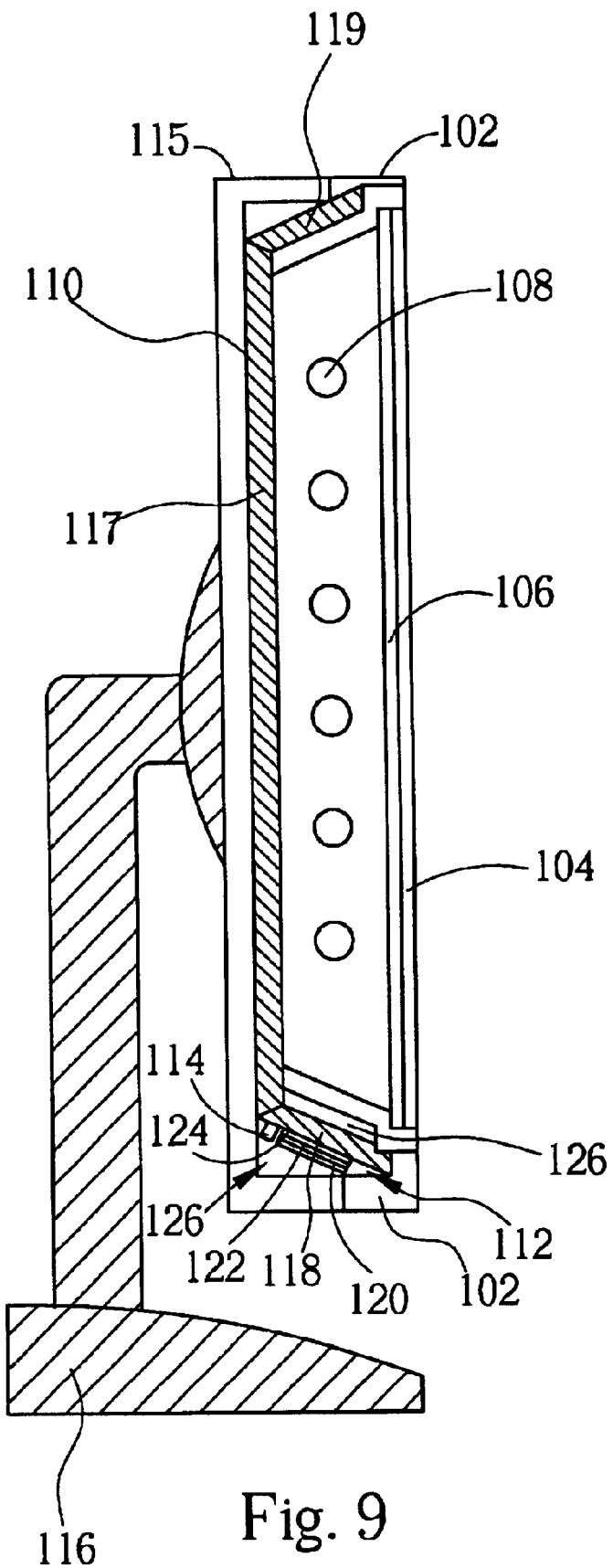
FIG. 9 is a cross-sectional view of the third embodiment of the present invention along a line 5–5" shown in FIG. 3.

Please Refer to FIG. 8, and FIG. 9. FIG. 8 illustrates components of the LCD apparatus 40 according to the third embodiment of the present invention. FIG. 9 is a cross-sectional view of the LCD apparatus 40. The LCD apparatus 40 comprises an upper frame 102, a liquid crystal display panel 104 installed inside the upper frame 102, a light tube array 108 installed behind the display panel 104 for generating white light, a diffuser 106 interposed between the display panel 104 and the light tube array 108 in order to uniformly diffuse the light generated by the light tube array 108, a reflecting plate 110 disposed behind the light tube array 108, a supporting frame 111 installed on the reflecting plate 110 to support the liquid crystal display panel 104 and the diffuser 106, a circuit board 112 to control the display panel 104, a connector 114 to receive signals sent by imaging devices, and a lower frame 115. The reflecting plate 110 comprises a main portion 117 and two side portions 118, 119. Each of the side portions 118, 119 is tilted with respect to the main portion 117. The main portion 117 of the reflecting plate 110 along with the supporting frame 111 constitute a reflecting surface, which reflects the light generated by the light tube array 108. It is noteworthy that a gap 126 exists between the side portion 118 and the lower frame 115. Then, the circuit board 112 is installed within the gap 126. The circuit board 112 comprises at least an X-board 120 to drive pixels in the same row for displaying corresponding data, a control board 122 used to control the X-board 120, and an A/D board 124 to convert analog signals into digital signals. The circuit board 112 can be a rigid circuit board or a printed circuit board. The circuit board 112 could also Include an electromagnetic interference shield to shield the electromagnetic radiation generated by the circuit board 112. In this embodiment, the circuit board 112 and connector 114 are installed onto the side portion 118 of the reflecting plate 110 and protected by the lower frame 115. The lower frame 115 could be any shape and size to provide protection and/or shield for the circuit board 112 and is not limited to a lower housing case to enclose the whole reflecting plate 110 and supporting frame 111. A stand assembly 116 could be further provided and coupled to either the reflecting plate 117 or the lower frame 115 to support the LCD apparatus 40. Without any circuit board 112 is installed on the back of the reflecting plate 110, the thickness of the LCD apparatus 40 is reduced.

Figure 10:
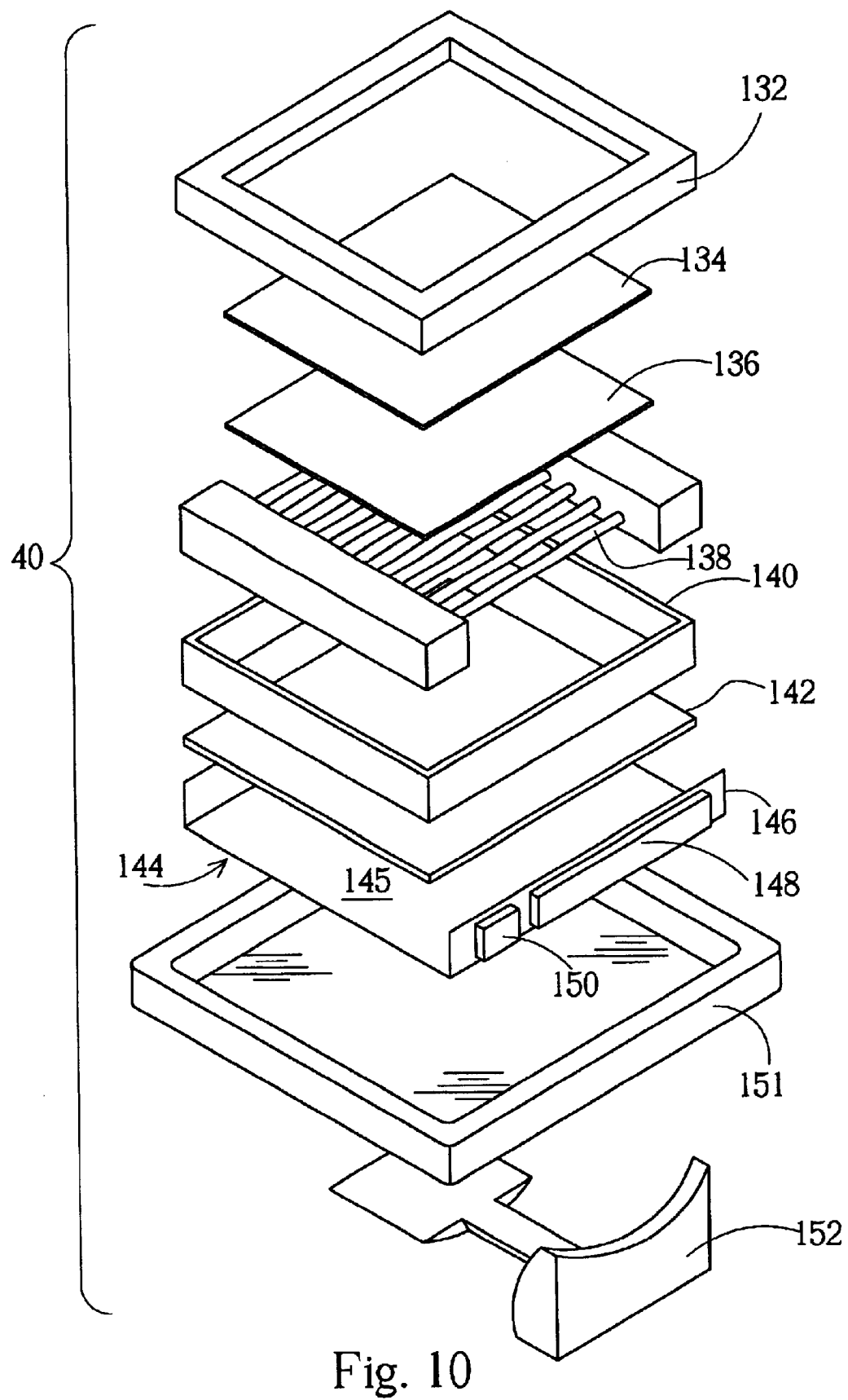
FIG. 10 is an exploded perspective view of a forth embodiment of the present Invention shown in FIG. 3.
Figure 11:
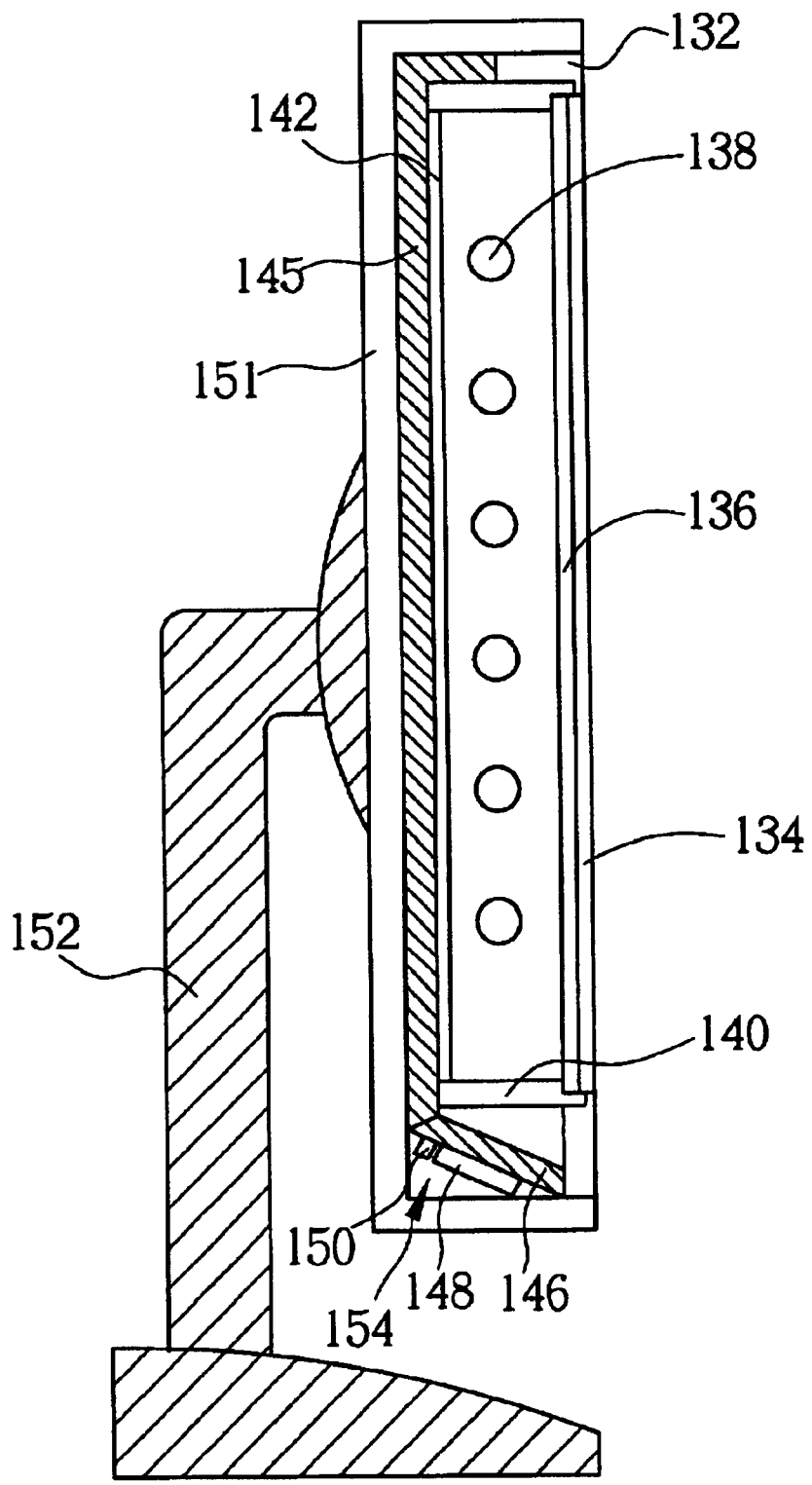
FIG. 11 is a cross-sectional view of the forth embodiment of the present invention along a line 5–5" shown in FIG. 3.

Please refer to FIG. 10 and FIG. 11. FIG. 10 is an exploded perspective view of a fourth embodiment of the present invention and FIG. 11 is a cross-sectional view of the forth embodiment along a line 5–5" shown in FIG. 3. The LCD apparatus 40 comprises an upper frame 132, a liquid crystal display panel 134 installed inside the upper frame 132, a light tube array 138 installed behind the display panel 134 for generating white light, a diffuser 136 interposed between the liquid crystal display panel 134 and the light tube array 138 in order to uniformly diffuse the light generated by the light tube array 138, a supporting frame 140 for supporting the liquid crystal display panel 134, a reflecting sheet 142 for reflecting light generated by the light tube array 138,and a supporting plate 144 for supporting the supporting frame 140. The supporting plate 144 has a main portion 145 and at least one side portion 146. The reflecting sheet 142 is positioned onto the main portion 145. The LCD apparatus 40 further comprises a circuit board 148 and a connector 150 installed onto the side portion 146 and protected by a lower frame 151. It is noteworthy that a gap 154 exists between the side portion 146 and the lower frame 151. Then, the circuit board 148 is installed within the gap 156. The circuit board 148 could also include an electromagnetic interference shield to shield the electromagnetic radiation generated by the circuit board 148. For example, a heatsink covering the circuit board 148 not only prevents the circuit board 148 from running under high temperature, but also functions as an electromagnetic interference shield. The lower frame 151 could be any shape and size to provide protection and/or shield for the circuit board 148 and is not limited to a lower housing case to enclose the whole supporting plate 144 and supporting frame 140. A stand assembly 152 could be further provided and coupled to either the supporting plate 144 or the lower frame 151 to support the LCD apparatus 40. Without any circuit board 148 installed on the back side of the reflecting plate 144, the thickness of the LCD apparatus 40 is reduced.

Figure 12:
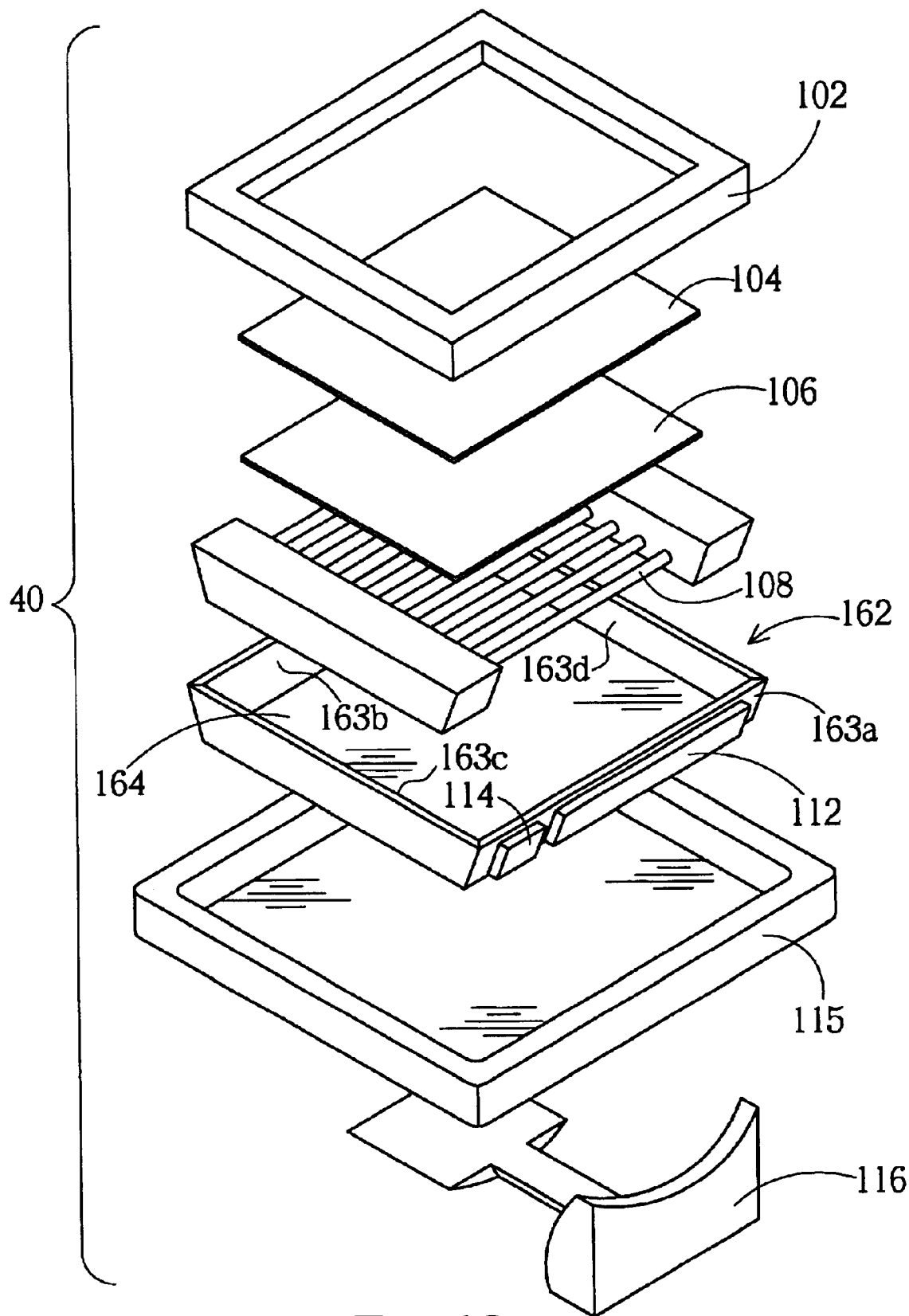
FIG. 12 is an exploded perspective view of a fifth embodiment of the present invention shown in FIG. 3.

Please Refer to FIG. 12, which illustrates components of the LCD apparatus 40 according to a fifth embodiment of the present invention. The only difference between this fifth embodiment and the third embodiment is that the reflecting plate 110 shown in FIG. 8 incorporates the supporting frame 111 shown in FIG. 8 to form an integrated supporting unit 162. The integrated supporting unit 162 further simplifies the whole structure of the LCD apparatus 40, and accordingly reduces thickness and cost of the LCD apparatus 40. The integrated supporting unit 162 comprises four sub-frames 163a, 163b, 163c, 163d and a main portion 164. The sub-frames 163a, 163b, 163c, 163 are mainly used to make the LCD apparatus 40 firm and solid. The main portion 164 is mainly used to reflect light generated by the light tube array 108. In other words, the integrated supporting unit 162 in the fifth embodiment has two functions originally provided by the reflecting plate 110 and the supporting frame 111. The connector 114 and the circuit board 112, therefore, are positioned onto one of the sub-frames 113a, 113b, 113c, 113d (the sub-frame 113a for example). It is noteworthy that the circuit board 112 could also include an electromagnetic interference shield to shield the electromagnetic radiation generated by the circuit board 112. For example, a heatsink covering the circuit board 112 not only prevents the circuit board 112 from running under high temperature, but also functions as an electromagnetic interference shield. In addition, the stand assembly 116 is coupled to lower frame 116 to support the LCD apparatus 40.

Figure 13:
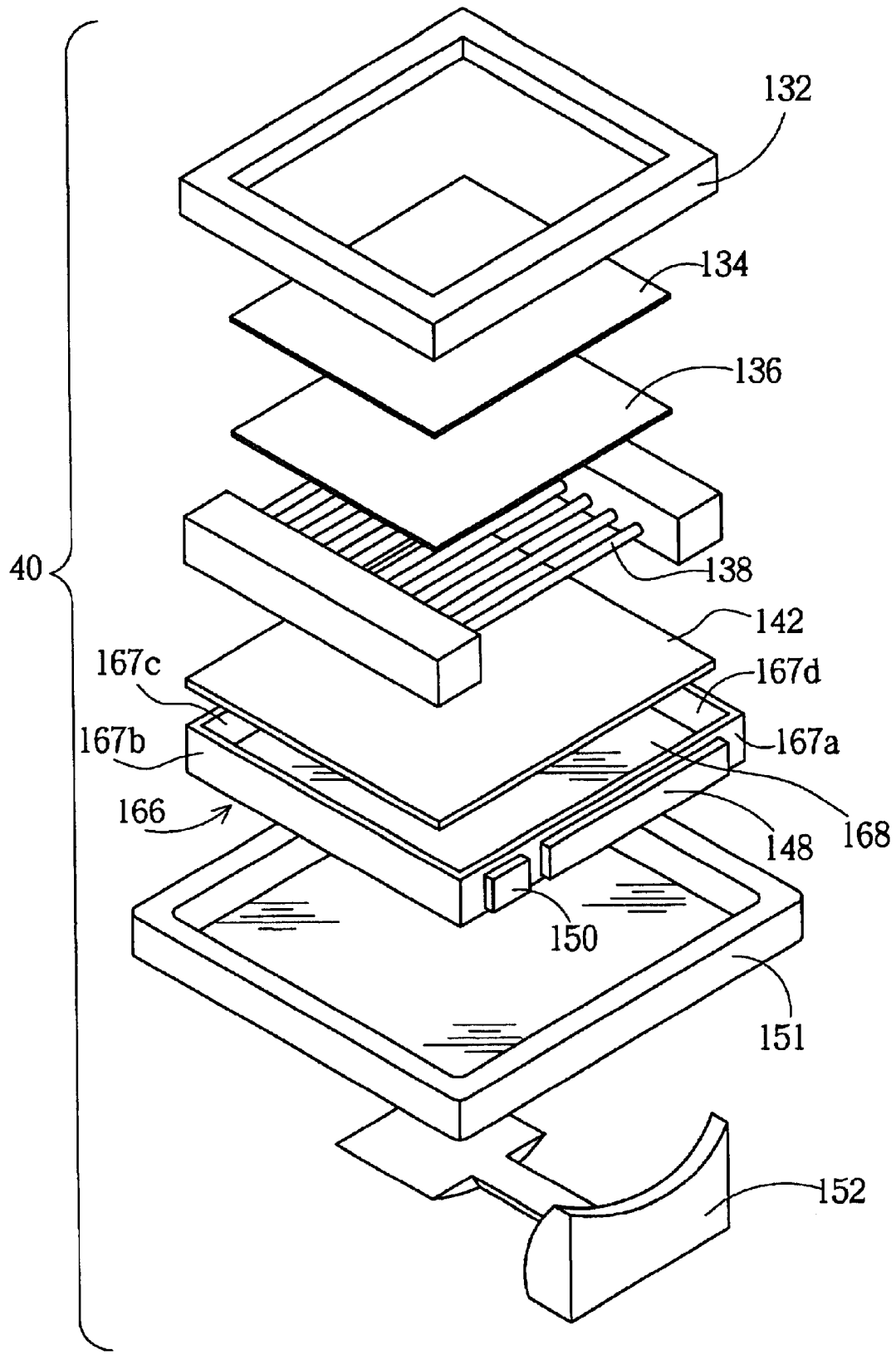
FIG. 13 is an exploded perspective view of a sixth embodiment of the present invention shown in FIG. 3.

Please refer to FIG. 13, which illustrates components of the LCD apparatus 40 according to a sixth embodiment of the present invention. The only difference between this sixth embodiment and the forth embodiment is that the supporting plate 144 shown in FIG. 10 incorporates the supporting frame 140 shown in FIG. 10 to form an integrated supporting unit 166. The integrated supporting unit 166 further simplifies the whole structure of the LCD apparatus 40, and accordingly reduces thickness and cost of LCD apparatus 40. The integrated supporting unit 166 comprises four sub-frames 167a, 167b, 167c, 167d and a main portion 168. The integrated supporting unit 166 is mainly used to make the LCD apparatus 40 firm and solid. The reflecting sheet 142 for reflecting light generated by the light tube array 138 is positioned onto the main portion 168. The connector 150 and the circuit board 148, therefore, are both positioned onto one of the sub-frames 167a, 167b, 167c, 167d (sub-frame 167a for example). It is noteworthy that the circuit board 148 could also include an electromagnetic Interference shield to shield the electromagnetic radiation generated by the circuit board 148. For example, a heatsink covering the circuit board 148 not only prevents the circuit board 148 from running under high temperature, but also functions as an electromagnetic interference shield. In addition, the stand assembly 152 is coupled to the lower frame 152 to support the LCD apparatus 40.

As shown in FIG. 8 and FIG. 12, the stand assembly 116 is fixed on the lower frame 115. However, the stand assembly 116 is capable of piercing through the lower frame 155 to connect with the reflecting plate 110 (third embodiment) or the integrated supporting unit 162 (fifth embodiment). The reflecting plate 110 and the stand assembly 116, therefore, are coupled together to support the LCD apparatus 40. The integrated supporting unit 162 and the stand assembly 116 are connected to support the LCD apparatus 40 in the same way. As shown in FIG. 10 and FIG. 13, the stand assembly 152 is fixed on the lower frame 151. However, the stand assembly 152 is capable of piercing through the lower frame 151 to connect with the supporting plate 144 (fourth embodiment)or the integrated supporting unit 166 (sixth embodiment). The supporting plate 144 and the stand assembly 152, therefore, are coupled together to support the LCD apparatus 40. The Integrated supporting unit 166 and the stand assembly 152 are connected to support the LCD apparatus 40 in the same way.

Compared with the prior art direct-type LCD apparatus, the present invention utilizes the space between the side portions of the reflecting plate and the supporting frame (first preferred embodiment), the side portions of the supporting plate and the supporting frame (second preferred embodiment), the side portion of the supporting plate and the lower frame9third and fifth embodiments), or the side portion of the reflecting plate and the lower frame (fourth and sixth embodiments) to house the circuit board and related elements. As a result, the thickness of the direct-type LCD apparatus is reduced without the circuit board and related elements positioned at the back of the LCD apparatus. Therefore, it makes the LCD apparatus more convenient to use. Furthermore, the present invention utilizes the main portion of the reflecting plate (first preferred embodiment) or the supporting plate (second preferred embodiment) as a frame structure to replace the lower frame of the prior art LCD apparatus. The entire apparatus is supported by the stand assembly in combination with the main portion of the reflecting plate or the main portion of the supporting plate. No extra lower frames are required to protect the circuit board and support the apparatus. Accordingly, the overall production cost and weight of the LCD apparatus are greatly reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A display apparatus comprising:
    an upper frame;
    a display panel installed inside the upper frame for displaying images;
    an array of light tubes disposed behind the display panel for generating light;
    a reflecting plate disposed behind the array of light tubes for reflecting light generated by the array of light tubes, the reflecting plate having a main portion and at least one side portion being tilted with respect to the main portion;
    a supporting frame installed on the reflecting plate for supporting the display panel, the supporting frame comprising a plurality of sub-frames, at least one of the sub-frames being tilted with respect to the main portion of the reflecting plate and being separated from the side portion by a gap; and
    a circuit board installed within the gap for controlling operations of the display apparatus.

2. The display apparatus of claim 1 wherein the display panel is a liquid crystal display panel.

3. The display apparatus of claim 1 further comprising a stand assembly having one end coupled to the reflecting plate.

4. The display apparatus of claim 1 further comprising a stand assembly having one end coupled to the upper frame.

5. The display apparatus of claim 1 further comprising a diffuser interposed between the display panel and the array of light tubes for diffusing light generated by the array of light tubes.

6. The display apparatus of claim 1 further comprising an EMI (electromagnetic interference) shield covering the circuit board for shielding radiation.

7. The display apparatus of claim 1 wherein the circuit board comprises an X-board for driving the display panel, a control board for controlling the X-board, and an A/D converter for converting analog signals into digital signals.

8. A display apparatus comprising:
an upper frame;
a display panel installed inside the upper frame for displaying images;
an array of light tubes disposed behind the display panel for generating light;
a reflecting sheet disposed behind the array of light tubes for reflecting light generated by the array of light tubes;
a supporting plate having a main portion and at least one side portion being tilted with respect to the main portion, the main portion used for supporting the reflecting sheet;
a supporting frame disposed on the supporting plate for supporting the display panel, the supporting frame comprising a plurality of sub-frames, at least one of the sub-frames being tilted with respect to the main portion of the supporting plate and being separated from the side portion of the supporting plate by a gap; and
a circuit board installed within the gap for controlling operations of the display apparatus.

9. The display apparatus of claim 8 wherein the display panel is a liquid crystal display panel.

10. The display apparatus of claim 8 further comprising a stand assembly having one end coupled to the supporting plate.

11. The display apparatus of claim 8 further comprising a stand assembly having one end coupled to the upper frame.

12. The display apparatus of claim 8 further comprising a diffuser interposed between the display panel and the array of light tubes for diffusing light generated by the array of light tubes.

13. The display apparatus of claim 8 further comprising an EMI (electromagnetic interference) shield covering the circuit board for shielding radiation.

14. The display apparatus of claim 8 wherein the circuit board comprises an X-board for driving the display panel, a control board for controlling the X-board, and an A/D converter for converting analog signals into digital signals.

15. A display apparatus comprising:
an upper frame;
a display panel installed inside the upper frame for displaying images;
an array of light tubes disposed behind the display panel for generating light;
a reflecting plate disposed behind the array of light tubes for reflecting light generated by the array of light tubes, the reflecting plate having a main portion and at least one side portion being tilted with respect to the main portion;
a supporting frame installed on the reflecting plate for supporting the display panel; and
a circuit board installed on the side portion of the reflecting plate for controlling operations of the display apparatus.

16. The display apparatus of claim 15 wherein the display panel is a liquid crystal display panel.

17. The display apparatus of claim 15 further comprising a stand assembly having one end coupled to the reflecting plate.

18. The display apparatus of claim 15 further comprising a stand assembly having one end coupled to the upper frame.

19. The display apparatus of claim 15 further comprising a diffuser interposed between the display panel and the array of light tubes for diffusing light generated by the array of light tubes.

20. The display apparatus of claim 15 further comprising an EMI (electromagnetic interference) shield covering the circuit board for shielding radiation.

21. The display apparatus of claim 15 wherein the circuit board comprises an X-board for driving the display panel, a control board for controlling the X-board, and an A/D converter for converting analog signals into digital signals.

22. A display apparatus comprising:
a upper frame;
a display panel installed inside the upper frame for displaying images;
an array of light tubes disposed behind the display panel for generating light;
a reflecting sheet disposed behind the array of light tubes for reflecting light generated by the array of light tubes;
a supporting plate having a main portion and at least one side portion being tilted with respect to the main portion, the main portion used for supporting the reflecting sheet;
a supporting frame installed on the main portion of the supporting plate for supporting the display panel; and
a circuit board installed on the side portion of the supporting plate for controlling operations of the display apparatus.

23. The display apparatus of claim 22 wherein the display panel is a liquid crystal display panel.

24. The display apparatus of claim 22 further comprising a stand assembly having one end coupled to the supporting plate.

25. The display apparatus of claim 22 further comprising a stand assembly having one end coupled to the upper frame.

26. The display apparatus of claim 22 further comprising a diffuser interposed between the display panel and the array of light tubes for diffusing light generated by the array of light tubes.

27. The display apparatus of claim 22 further comprising an EMI (electromagnetic interference) shield covering the circuit board for shielding radiation emitted by the circuit board.

28. The display apparatus of claim 22 wherein the circuit board comprises an X-board for driving the display panel, a control board for controlling the X-board, and an A/D converter for converting analog signals into digital signals.

29. A display apparatus comprising:
an upper frame;
a display panel installed inside the upper frame for displaying images;
an array of light tubes disposed behind the display panel for generating light;
an integrated supporting unit disposed behind the array of light tubes having a main portion and at least one side portion being tilted with respect to the main portion for reflecting light generated by the array of light tubes and supporting the display panel; and
a circuit board installed on at least one of the side portions of the reflecting plate for controlling operations of the display apparatus.

30. The display apparatus of claim 29 wherein the display panel is a liquid crystal display panel.

31. The display apparatus of claim 29 further comprising a stand assembly having one end coupled to the integrated supporting unit.

32. The display apparatus of claim 29 further comprising a stand assembly having one end coupled to the upper frame.

33. The display apparatus of claim 29 further comprising a diffuser interposed between the display panel and the array of light tubes for diffusing light generated by the array of light tubes.

34. The display apparatus of claim 29 further comprising an EMI (electromagnetic interference) shield covering the circuit board for shielding radiation.

35. The display apparatus of claim 29 wherein the circuit board comprises an X-board for driving the display panel, a control board for controlling the X-board, and an A/D converter for converting analog signals into digital signals.

36. A display apparatus comprising:
   an upper frame;
   a display panel installed inside the upper frame for displaying images;
   an array of light tubes disposed behind the display panel for generating light;
   a reflecting sheet disposed behind the array of light tubes for reflecting light generated by the array of light tubes;
   an integrated supporting unit comprising a main portion and at least one side portion being tilted with respect to the main portion for supporting the reflecting sheet and the display panel; and
   a circuit board installed on at least one of the side portions of the supporting plate for controlling operations of the display apparatus.

37. The display apparatus of claim 36 wherein the display panel is a liquid crystal display panel.

38. The display apparatus of claim 36 further comprising a stand assembly having one end coupled to the integrated supporting unit.

39. The display apparatus of claim 36 further comprising a stand assembly having one end coupled to the upper frame.

40. The display apparatus of claim 36 further comprising a diffuser interposed between the display panel and the array of light tubes for diffusing light generated by the array of light tubes.

41. The display apparatus of claim 36 further comprising an EMI (electromagnetic interference) shield covering the circuit board for shielding radiation emitted by the circuit board.

42. The display apparatus of claim 36 wherein the circuit board comprises an X-board for driving the display panel, a control board for controlling the X-board, and an A/D converter for converting analog signals into digital signals.

* * * * *

(12) EX PARTE REEXAMINATION CERTIFICATE (8443rd)
United States Patent
Fan et al.

(10) Number: US 6,734,926 C1
(45) Certificate Issued: Aug. 2, 2011

(54) DISPLAY APPARATUS WITH A REDUCED THICKNESS

(75) Inventors: Kuo-Shu Fan, Miao-Li Hsien (TW); Chin-Lung Ting, Taipei (TW)

(73) Assignee: Chi Mei Optoelectronics Corporation, Tainan Hsien (TW)

Reexamination Request:
No. 90/009,618, Dec. 10, 2009

Reexamination Certificate for:
Patent No.: 6,734,926
Issued: May 11, 2004
Appl. No.: 10/065,039
Filed: Sep. 13, 2002

(51) Int. Cl.
*G02F 1/13* (2006.01)
*G02F 1/13357* (2006.01)
*G02F 1/1335* (2006.01)

(52) U.S. Cl. .................. 349/58; 349/149; 349/150; 349/151; 349/152

(58) Field of Classification Search .............. 349/58
See application file for complete search history.

(56) References Cited

U.S. PATENT DOCUMENTS

| | | |
|---|---|---|
| 3,892,959 A | 7/1975 | Pulles |
| 4,330,813 A | 5/1982 | Deutsch |
| 4,826,294 A | 5/1989 | Imoto |
| 5,019,002 A | 5/1991 | Holmberg |
| 5,029,984 A * | 7/1991 | Adachi et al. .............. 349/150 |
| 5,068,748 A | 11/1991 | Ukai et al. |
| 5,113,232 A | 5/1992 | Itoh et al. |
| 5,126,868 A | 6/1992 | Kizaki et al. |
| 5,184,237 A | 2/1993 | Iimura et al. |
| 5,196,953 A | 3/1993 | Yeh et al. |
| 5,220,443 A | 6/1993 | Noguchi |
| 5,233,448 A | 8/1993 | Wu |
| 5,303,055 A | 4/1994 | Hendrix et al. |
| 5,311,340 A | 5/1994 | Murata et al. |
| 5,353,142 A | 10/1994 | Dodd |
| 5,375,006 A | 12/1994 | Haas |
| 5,377,033 A | 12/1994 | Radcliffe |
| 5,410,453 A | 4/1995 | Ruskouski |
| 5,432,626 A * | 7/1995 | Sasuga et al. .............. 349/58 |
| 5,440,197 A | 8/1995 | Gleckman |
| 5,450,500 A | 9/1995 | Brett |
| 5,460,748 A | 10/1995 | Mazaki et al. |
| 5,467,208 A | 11/1995 | Kokawa et al. |
| 5,472,635 A | 12/1995 | Iida et al. |
| 5,504,348 A | 4/1996 | Yoshida et al. |
| 5,506,706 A | 4/1996 | Yamahara et al. |
| 5,526,150 A | 6/1996 | Mazaki et al. |
| 5,576,861 A | 11/1996 | Abileah et al. |
| 5,594,830 A | 1/1997 | Winston et al. |
| 5,606,340 A | 2/1997 | Suzuki et al. |
| 5,764,216 A | 6/1998 | Tanaka et al. |
| 5,852,480 A | 12/1998 | Yajima et al. |
| 5,857,767 A | 1/1999 | Hochstein |
| 5,883,684 A | 3/1999 | Millikan et al. |
| 6,008,786 A | 12/1999 | Kimura et al. |
| 6,013,923 A | 1/2000 | Huang |

(Continued)

FOREIGN PATENT DOCUMENTS

| | | |
|---|---|---|
| JP | 05313180 A * | 11/1993 |
| JP | 9-115322 | 5/1997 |

*Primary Examiner*—Erik Kielin

(57) ABSTRACT

An LCD apparatus with a reduced thickness comprises an upper frame to protect internal components, a display panel installed inside the upper frame, a light tube array disposed behind the display panel, a reflecting plate behind the light tube array, a supporting frame installed on the reflecting plate for supporting the display panel, and a circuit board for controlling the operation of the LCD apparatus. The reflecting plate comprises a main portion and a plurality of side portions. The circuit board is an integration of all control boards using printed circuit board assembly technology and is disposed on at least one of the side portions of the reflecting plate. The main portion of the reflecting plate serves as another frame and is coupled to an end of a stand assembly to support the LCD apparatus.

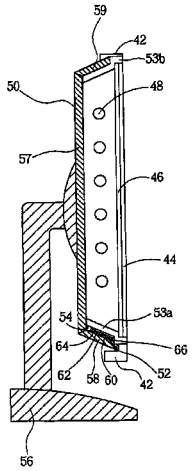

U.S. PATENT DOCUMENTS

| | | |
|---|---|---|
| 6,043,591 A | 3/2000 | Gleckman |
| 6,072,551 A | 6/2000 | Jannson et al. |
| 6,134,092 A | 10/2000 | Pelka et al. |
| 6,407,781 B2 | 6/2002 | Kitada |
| 6,504,587 B1 | 1/2003 | Morishita et al. |
| 6,522,543 B2 | 2/2003 | Kurihara et al. |
| 6,559,908 B2 | 5/2003 | Hiratsuka et al. |
| 6,862,053 B2 | 3/2005 | Lee et al. |
| 7,102,726 B2 | 9/2006 | Byun et al. |
| 7,218,374 B2 | 5/2007 | Park et al. |
| 7,271,904 B2 | 9/2007 | Jung et al. |
| 7,280,179 B2 | 10/2007 | Hsu et al. |
| 2001/0002145 A1 * | 5/2001 | Lee et al. ..................... 349/58 |
| 2006/0012969 A1 * | 1/2006 | Bachman ................... 361/816 |

* cited by examiner

US 6,734,926 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 5-9, 12-16, 19-23, 26-28 and 36-42 is confirmed.

Claim 29 is determined to be patentable as amended.

Claims 30-35, dependent on an amended claim, are determined to be patentable.

New claims 43-62 are added and determined to be patentable.

Claims 3, 4, 10, 11, 17, 18, 24 and 25 were not reexamined.

29. A display apparatus comprising:
an upper frame;
a display panel installed inside the upper frame for displaying images;
an array of light tubes disposed behind the display panel for generating light;
an integrated supporting unit disposed behind the array of light tubes having a main portion and at least one side portion being tilted with respect to the main portion for reflecting light generated by the array of light tubes and supporting the display panel; and
a circuit board installed on at least one of the side portions of the [reflecting plate] *integrated supporting unit* for controlling operations of the display apparatus.

43. *A display apparatus comprising:*
*an upper frame;*
*a display panel installed inside the upper frame for displaying images;*
*an array of light tubes disposed behind the display panel for generating light;*
*an integrated supporting unit disposed behind the array of light tubes having a main portion and at least one side portion being tilted with respect to the main portion for reflecting light generated by the array of light tubes and supporting the display panel; and*
*a circuit board installed on at least one of the side portions of the integrated supporting unit for controlling operations of the display apparatus;*
*wherein the at least one side portion is a substantially planar elongate member.*

44. *The display apparatus of claim 43 further comprising a stand assembly having one end coupled to the integrated supporting unit.*

45. *The display apparatus of claim 43 further comprising a stand assembly having one end coupled to the upper frame.*

46. *The display apparatus of claim 43 further comprising an EMI (electromagnetic interference) shield covering the circuit board for shielding radiation.*

47. *The display apparatus of claim 43 wherein the circuit board comprises an X-board for driving the display panel, a control board for controlling the X-board, and an A/D converter for converting analog signals into digital signals.*

48. *The display apparatus of claim 43 wherein the apparatus is a stand-alone LCD computer monitor.*

49. *The display apparatus of claim 43, wherein at least part of the integrated supporting unit is constructed of plastic.*

50. *The display apparatus of claim 43, wherein the at least one side portion is an extension of a plate member that comprises the main portion.*

51. *A display apparatus comprising:*
*an upper frame;*
*a display panel installed inside the upper frame for displaying images;*
*an array of light tubes disposed behind the display panel for generating light;*
*a reflecting sheet disposed behind the array of light tubes for reflecting light generated by the array of light tubes;*
*an integrated supporting unit comprising a main portion and at least one side portion being tilted with respect to the main portion for supporting the reflecting sheet and the display panel; and*
*a circuit board installed on at least one of the side portions of the integrated supporting unit for controlling operations of the display apparatus;*
*wherein the at least one side portion is an extension of a plate member that comprises the main portion.*

52. *The display apparatus of claim 51 further comprising a stand assembly having one end coupled to the integrated supporting unit.*

53. *The display apparatus of claim 51 further comprising a stand assembly having one end coupled to the upper frame.*

54. *The display apparatus of claim 51 further comprising an EMI (electromagnetic interference) shield covering the circuit board for shielding radiation.*

55. *The display apparatus of claim 51 wherein the circuit board comprises an X-board for driving the display panel, a control board for controlling the X-board, and an A/D converter for converting analog signals into digital signals.*

56. *The display apparatus of claim 51, wherein the apparatus is a stand-alone LED computer monitor.*

57. *The display apparatus of claim 51, wherein at least part of the integrated supporting unit is constructed of plastic.*

58. *The display apparatus of claim 51, comprising at least two of said side portions.*

59. *The display apparatus of claim 58, wherein each of said at least two side portions has installed thereon a circuit board.*

60. *The display apparatus of claim 43, comprising at least two of said side portions.*

61. *The display apparatus of claim 60, wherein each of said at least two side portions has installed thereon a circuit board.*

62. *The display apparatus of claim 8, wherein the supporting plate includes multiple side portions that are tilted with respect to the main portion, the multiple side portions each having installed thereon a circuit board.*

* * * * *

INTER PARTES REEXAMINATION CERTIFICATE (638th)
United States Patent
Fan et al.

(10) Number: US 6,734,926 C2
(45) Certificate Issued: Jul. 16, 2013

(54) DISPLAY APPARATUS WITH A REDUCED THICKNESS

(75) Inventors: Kuo-Shu Fan, Miao-Li Hsien (TW); Chin-Lung Ting, Taipei (TW)

(73) Assignee: ChiMei Innolux Corporation, Chu-Nan, Miao-Li County (TW)

Reexamination Request:
No. 95/001,825, Nov. 17, 2011

Reexamination Certificate for:
Patent No.: 6,734,926
Issued: May 11, 2004
Appl. No.: 10/065,039
Filed: Sep. 13, 2002

Reexamination Certificate C1 6,734,926 issued Aug. 2, 2011

(51) Int. Cl.
*G02F 1/1333* (2006.01)
*G02F 1/1345* (2006.01)

(52) U.S. Cl.
USPC .............................. 349/58; 349/149; 349/150

(58) Field of Classification Search
None
See application file for complete search history.

(56) References Cited

To view the complete listing of prior art documents cited during the proceeding for Reexamination Control Number 95/001,825, please refer to the USPTO's public Patent Application Information Retrieval (PAIR) system under the Display References tab.

*Primary Examiner* — Robert Nasser

(57) ABSTRACT

An LCD apparatus with a reduced thickness comprises an upper frame to protect internal components, a display panel installed inside the upper frame, a light tube array disposed behind the display panel, a reflecting plate behind the light tube array, a supporting frame installed on the reflecting plate for supporting the display panel, and a circuit board for controlling the operation of the LCD apparatus. The reflecting plate comprises a main portion and a plurality of side portions. The circuit board is an integration of all control boards using printed circuit board assembly technology and is disposed on at least one of the side portions of the reflecting plate. The main portion of the reflecting plate serves as another frame and is coupled to an end of a stand assembly to support the LCD apparatus.

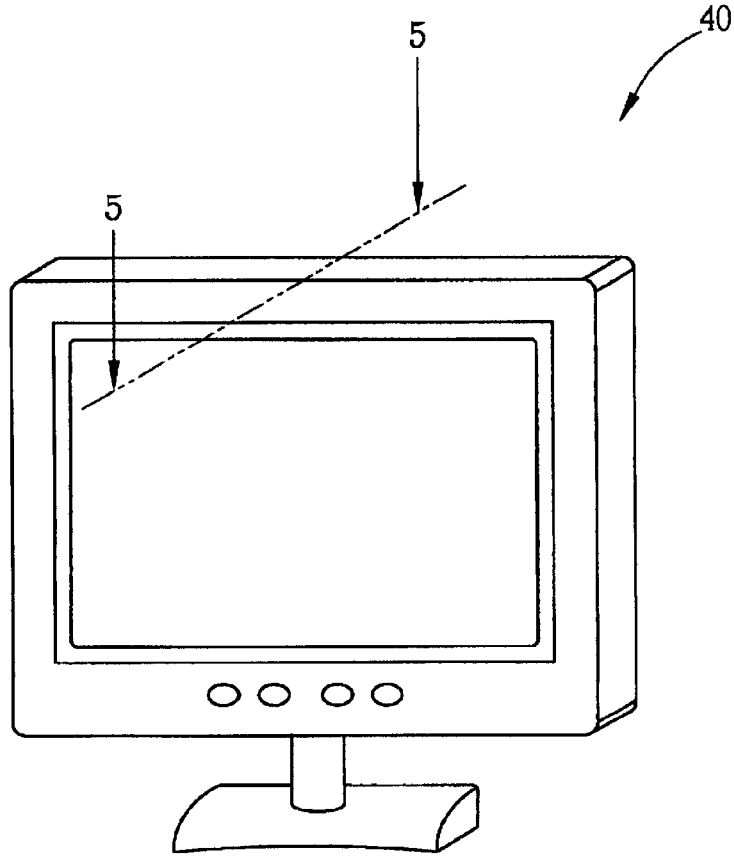

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1, 2, 5, 8, 9, 12, 15, 16, 19, 22, 23, 26, 29, 30, 33, 36, 37 and 40 are cancelled.

Claims 3, 4, 6, 7, 10, 11, 13, 14, 17, 18, 20, 21, 24, 25, 27, 28, 31, 32, 34, 35, 38, 39 and 41-62 were not reexamined.

* * * * *